May 17, 1932.  I. SHORT ET AL  1,859,007

REDUCTION GEARING

Filed Oct. 25, 1930  3 Sheets-Sheet 1

INVENTORS
Ira Short and
J. Ormondroyd
BY
ATTORNEY

May 17, 1932.　　I. SHORT ET AL　　1,859,007
REDUCTION GEARING
Filed Oct. 25, 1930　　3 Sheets-Sheet 2

INVENTOR
Ira Short and
J. Ormondroyd
BY
A. B. Reavis
ATTORNEY

Patented May 17, 1932

1,859,007

UNITED STATES PATENT OFFICE

IRA SHORT, OF ESSINGTON, AND JESSE ORMONDROYD, OF SWARTHMORE, PENNSYLVANIA, ASSIGNORS TO WESTINGHOUSE ELECTRIC AND MANUFACTURING COMPANY, A CORPORATION OF PENNSYLVANIA

REDUCTION GEARING

Application filed October 25, 1930. Serial No. 491,262.

Our invention relates to reduction gearing for connecting a source of power of substantially uniform torque to a shaft having a source of pulsating torque directly connected thereto and it has for an object to provide improved gearing capable of operating substantially without shock, at least under normal operating conditions.

Low-pressure turbines have been used for securing further expansion of steam exhausted from reciprocating marine engines in order to increase the power output for a given quantity of steam; however, the torque delivered by a reciprocating engine is pulsating in character while that delivered by a turbine is substantially uniform, and, if the turbine-gearing system and the engine-propeller-shaft system are rigidly connected together, objectionable noise, vibration or bumping, particularly in the gearing, may take place. It has heretofore been proposed to use hydraulic or spring means between the engine and turbine systems; and, in accordance with our invention, springs are incorporated between the driven gear of the reduction gearing and the propeller shaft to keep the deflection of the springs within reasonable limits and to minimize the mass subject to pulsating torque. Also, the springs have such flexibility that, above a predetermined speed and load, they are deflected by the turbine torque to an extent as great as or greater than the variation in deflection due to pulsating engine torque, whereby the springs will be under compression and exert driving effort in one direction irrespective of deflections due to pulsations. When the spring deflection due to torque variations in the engine, exceeds the deflection due to turbine torque, then the propeller shaft tends to drive the driven gear of the reduction gearing; and, while this would be objectionable, particularly at ordinary speeds and loads, this is avoided by our invention, any such excess existing only at lower or maneuvering speeds and not being objectionable. The springs are associated with the ends of the driven gear so that they are accessible, readily insertable and replaceable, and the design of the gear does not have to be materially altered on account thereof. Furthermore, the shaft carrying the driven gear is constructed and arranged to provide for lubrication of the bearings for the driven gear. Hence, a further object of our invention is to provide reduction gearing having these advantageous features of construction and operation.

A further object of my invention is to provide a driven gear of a marine reduction gear having spaced bearings fitting spaced journals on a supporting spindle, said journals being provided on an intermediate portion of the spindle of larger diameter than the main journals of the spindle arranged outwardly of and adjacent to the first journals to the end that the material of the spindle is advantageously disposed to give stiffness.

These and other objects are effected by our invention, as will be apparent from the following description and claims taken in connection with the accompanying drawings, forming a part of this application, in which:

Figure 1:
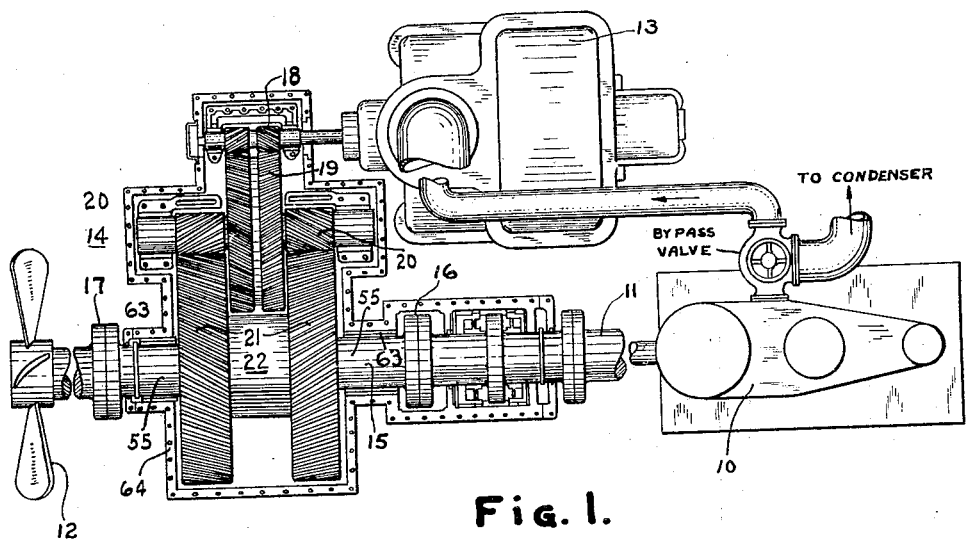
Fig. 1 is a diagrammatic view of a marine propulsion system incorporating our invention.
Figure 2:
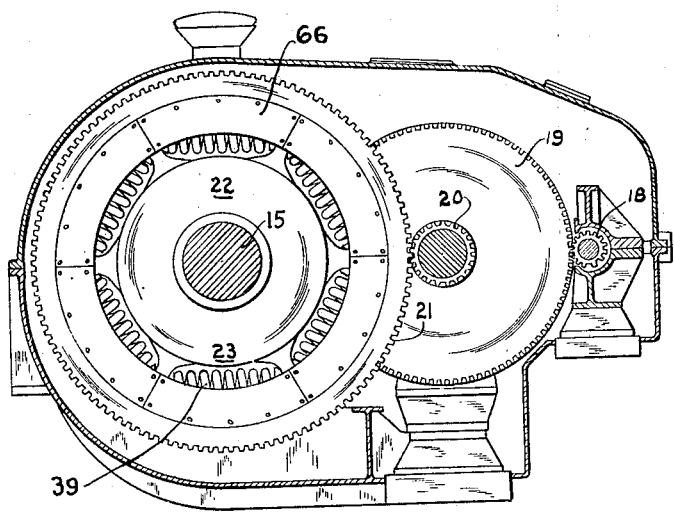
Fig. 2 is a vertical sectional view of gearing incorporating our improvement.

Referring now to the drawings more in detail, we show a reciprocating engine 10 connected to a propeller shaft 11 for driving a propeller 12. Steam exhausted from the reciprocating engine is further expanded in the turbine 13, which is connected by gearing, at 14, to the propeller shaft.

In order to accommodate the gearing within the length of the propeller shaft, the latter is preferably cut and has inserted the driven member or spindle 15 connected by couplings 16 and 17 to the forward and rearward parts of the propeller shaft.

As the turbine 13 operates normally at much higher speed than the reciprocating engine, it is necessary to connect the rotor of the turbine to the propeller shaft by means of reduction gearing, such gearing being indicated, at 14, and preferably including a driving pinion 18 meshing with the intermediate gear 19 unitary with intermediate pinion portions 20 meshing with gear portions 21 of the driven gear 22, the latter being related and connected to the driven spindle or member 15 in the manner and for the purposes to be immediately described.

The torque delivered by the engine 10 is pulsating in character while that delivered by the turbine is substantially uniform. It is, therefore, desirable to isolate the turbine-gearing system from the engine-propeller-shaft system to allow these systems to run as they please while at the same time providing for the transmission of power from the turbine-gear system to the propeller shaft. To this end, we provide spring couplings, at 23, for connecting the driven gear 22 to the driven spindle or member 15, the driven gear 22 being journalled on the driven spindle or member 15 to permit of relative angular movement incident to the couplings performing their function.

Figure 3:
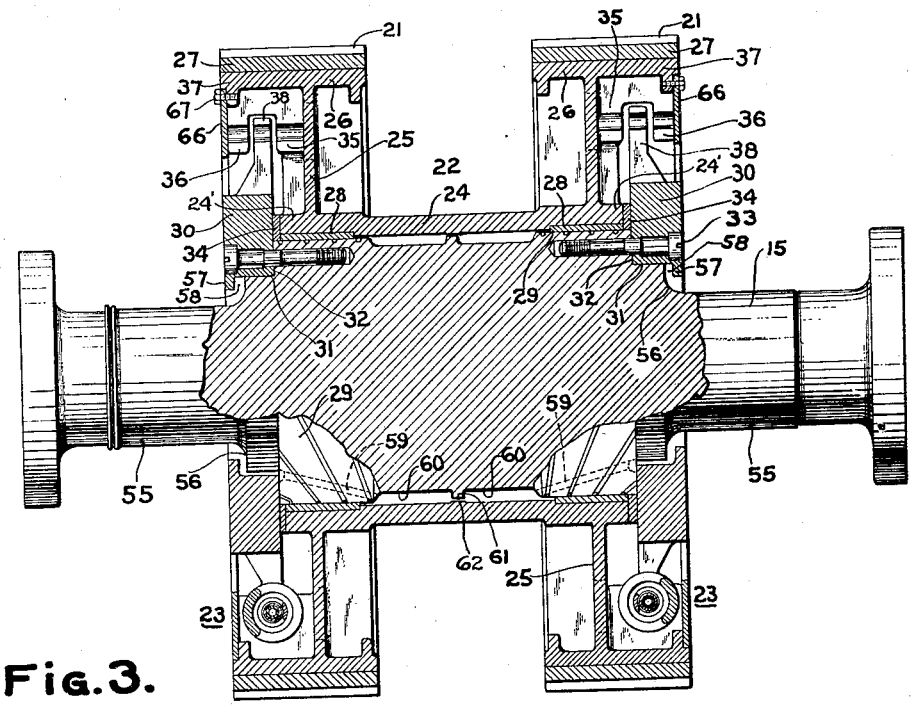
Fig. 3 is a sectional detail view of the driven gear taken on the line III—III of Fig. 4.
Figure 4:
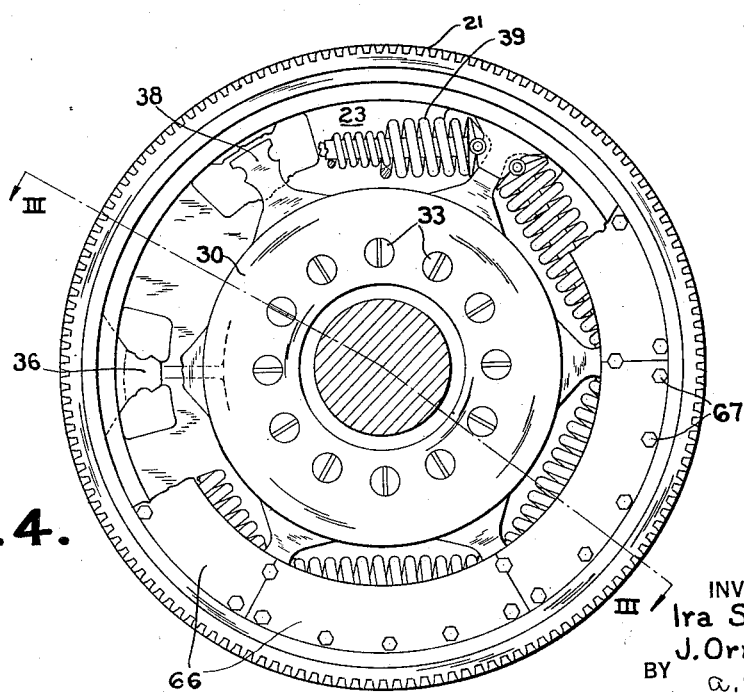
Fig. 4 is an end elevational view of the driven gear.
Figure 5:
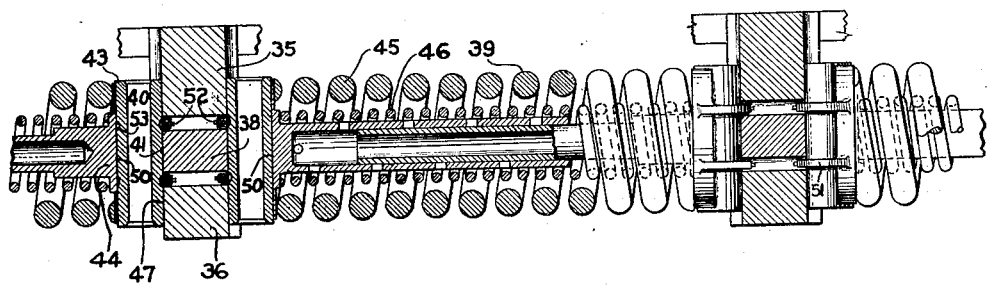
Fig. 5 is a detail view of one of the spring aggregates.
Figure 6:
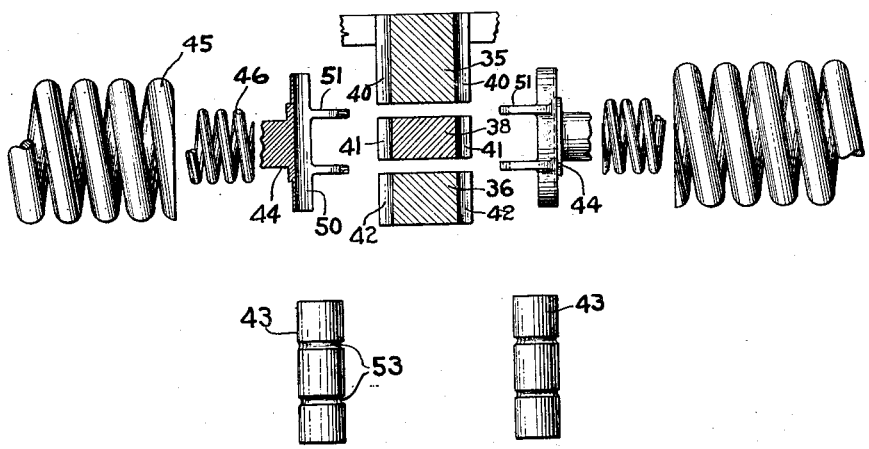
Fig. 6 is an exploded view of interfitting projections and spring abutments.

The driven gear 22 (Fig. 3) is preferably comprised of a hub portion 24 connected by web portions 25 to rim portions 26 carrying the gear rims 27. The hub portions are provided with bushings 28 fitting journal portions 29 on the driven element or spindle 15. The hub 24 extends outwardly beyond the webs 25 as shown at 24′.

The driven gear is held in place axially with respect to the shaft member 15 by means of collars or spiders 30 fitting the seats 31, abutting against the abutment surfaces 32 and being held in place by means of screws 33. Spacing washers or rings 34 are arranged between the hub ends and the collars or spiders 30 to take up any undesirable end play of the gear.

The couplings 23 provided at the ends of the driven gear 22 are comprised by cooperating projections and springs or spring aggregates. As shown, the driven gear is provided with spaced projections 35 and 36, integral with the adjacent web and rim portions 25 and 26, and the portions 37 of the rims 26 being disposed outwardly of the webs 25 so as to overhang the couplings. The projections 38 carried by the spiders 30 interfit between projections 35 and 36.

Spring aggregates 39 are arranged between the sets of interfitting projections 35, 36 and 38, each set being preferably provided with concave seats 40, 41 and 42 at each side to receive bearing portions 43 of abutments 44 of the spring aggregates. Each spring aggregate includes one or more springs, for example, the springs 45 and 46, and telescopic stem portions 47 and 48 to keep the springs disposed between the abutments thereof and the abutments of the aggregate in proper relative positions or alignment.

As shown, the spring 46 has a much smaller scale than the spring 45, so that, when the spring aggregates are assembled with the interfitting projections 35, 36 and 38 of the sets aligned, the springs 46 will be under compression just sufficient to hold the spring aggregates in place, the springs 45 being under little or no compression. In addition, the smaller springs carry part of the load and, therefore, reduce the stress to which the larger springs would otherwise be subjected.

The interfitting sets of projections 35, 36 and 38 are spaced apart such distances and the springs 45 and 46 are of such length and strength that they will be compressed due to the steady turbine torque to an extent as great as or greater than any deflection thereof occurring on account of variations in torque imposed on the propeller shaft by the reciprocating engine. As long as this condition obtains, the spring aggregates will be under compression and the direction of drive will be from the driven gear to the propeller shaft. As the springs must be strong enough to carry the load without excessive deflection, this imposes a limitation on flexibility and, therefore, makes it impossible to have the deflection relation just pointed out for all speeds and loads. However, it is possible to have this relation for normal operating speeds and loads; and, the speed at which the deflection on account of torque variation of the engine tends to exceed the deflection due to the turbine may be so chosen that the resulting noise or vibration taking place on account of the tendency of the turbine gear 22 to become a driving gear at low speeds and loads is not objectionable.

The bearing portions 43 of the abutments 44 are preferably comprised by tubular elements fitting concave seats 50 extending diametrically of the abutments, and such abutments are provided with strap elements 51 cooperating with the seats 50 to receive the tubular elements or bearing portions 43, the straps 51 having set screws 52 arranged to engage grooves or depressions 53 in the tubular elements to hold the latter in position. The strap portions 51 engage in the spaces between the interfitting projections 35, 36 and 38 to hold the spring aggregates in place with the bearing portions or tubular elements 43 thereof fitting the seats of the sets of projections. The bearing portions 43 are made tubular to permit of the insertion of suitable elements of a tool for compressing an aggregate incident to insertion or removal thereof.

As the driven gear 22 is journalled on the propeller or driven shaft element 15 for limited relative movement incident to spring deflection, it is necessary that the supporting bearing elements 28 and 29 shall be lubricated. To this end, (Fig. 3) the seats 31 are of less length than the thickness of the collars 30 and the seats are joined to the journals 55 by reduced portions or fillets 56. The collars or spiders 30 have inwardly-projecting ribs 57 spaced outwardly from the seats 31 to provide oil catcher grooves 58. Oil is supplied from the grooves 58 by passages 59 to chambers 60 between the shaft member 15 and the hub 24, the spaces or chambers 60 preferably being separated by mating ribs 61 and 62 carried by the shaft member and the hub, respectively, so that each set of bearing elements 28 and 29 is independently lubricated. The advantage of having independent spaces or chambers for the bearing elements is that, should oil escape more readily through one set of bearing elements, the supply of oil to the other set will not be impoverished, as might be the case if a single supply chamber was used for each set of bearing elements.

It will be noted that the major or intermediate portion of the spindle 15 having the terminal journals 29 is of larger diameter than the main journals 55. This gives maximum stiffness where required for a given spindle weight.

Oil may be supplied to the catcher grooves 58 in any suitable manner. For example, I show such grooves located adjacent to the bearings 63 (Fig. 1) cooperating with the journals 55 and carried by the gear casing 64. Surplus oil escaping inwardly from the bearings 63 enters the catcher groves 58 to pass to the bearing elements 28 and 29 to lubricate the latter.

Segmental cover plates 66 are arranged at each end of the driven gear 22, there preferably being a separate plate covering each spring aggregate 39, and the plates being connected to the rim portion 37 and to the projections 36 by suitable bolts or screws 67. Preferably, the plates 66 have limited inward radial extent so that the springs of the spring aggregates are at least partially visible. When the cover of the gear casing is removed, the upper aggregates will be exposed and the springs may be readily inspected. An aggregate 39 may be readily inserted or removed merely by removal of the corresponding segmental cover plate 66 and using a suitable compressing tool on the aggregate so that the abutments thereof may pass in or out between adjacent sets of projections.

From the foregoing, it will be apparent that we have devised gearing suitable for connecting uniform torque apparatus, such as a steam turbine, to a shaft directly connected to a fluctuating source of power, such as a reciprocating steam engine, the design of gearing being such that springs capable of carrying the load but permitting of maximum flexibility may be provided so that, for speeds and loads above a predetermined deflection of the springs due to constant torque shall not be less than that due to torque variations of the engine. The springs are accessible, observable, and may be removed or inserted without dismantling the gearing. In addition, no special modification of the driven gear is required, as the spring means are arranged interiorly of the rims outside of the webs, giving maximum space for the springs, and thereby permitting of suitable design of the latter, and the gear may have an adequate hub structure and supporting bearing capable of being simply and copiously lubricated.

While we have shown our invention in but one form, it will be obvious to those skilled in the art that it is not so limited, but is susceptible of various changes and modifications without departing from the spirit thereof, and we desire, therefore, that only such limitations shall be placed thereupon as are imposed by the prior art or as are specifically set forth in the appended claims.

What we claim is:

1. In reduction gearing, a spindle member having a pair of spaced outer journal portions separated from an intermediate portion of larger diameter by cylindrical seats of intermediate diameter, said intermediate portion having terminal journal portions and said seats being connected to said terminal journal portions by radial abutment faces; a gear member including a hub having spaced bearing portions fitting the terminal journal portions and provided with a pair of spaced webs connected to spaced gear rims; collars fitting said seats, abutting said abutment faces and of larger diameter than the hub bearings so as to hold the gear member axially in place; a circular series of screws extending substantially parallel to the gear axis for connecting each collar to the intermediate portion of the spindle; sets of interfitting radial projections carried by the collars and the gear member and arranged externally of said webs; and springs arranged between adjacent sets of projections.

2. The combination as claimed in claim 1 wherein the webs are joined to the hub substantially midway axially of the bearing portions.

3. In reduction gearing, a spindle having outer journal portions, inner journal portions, circumferential seating portions between adjacent inner and outer journal portions, and abutment surfaces between adjacent inner journal and seating portions; a driven gear having a hub provided with interior bearing portions fitting the inner journal portions and spiders fitting said seating portions and abutting said abutment surfaces and serving to hold the gear in place axially; sets of interfitting projections provided on the gear and on the spiders; springs arranged between adjacent sets of projections; inwardly projecting annular flanges provided on the spiders and spaced from the outer ends of said seating portions so as to form oil catcher grooves, said oil catcher grooves being arranged adjacent to said outer journal portions to receive oil from the latter; and means for supplying oil from said oil catcher grooves to the inner journal and hub bearing portions.

In testimony whereof, we have hereunto subscribed our names this 21st day of October, 1930.

IRA SHORT.
JESSE ORMONDROYD.